United States Patent
Gul et al.

(10) Patent No.: US 12,552,980 B2
(45) Date of Patent: *Feb. 17, 2026

(54) OIL SOLUBLE MOLYBDENUM COMPLEXES AS HIGH TEMPERATURE FOULING INHIBITORS

(71) Applicant: Ecolab USA Inc., St. Paul, MN (US)

(72) Inventors: Omer Gul, Rosenberg, TX (US); Oussama Zenasni, Houston, TX (US); Janelle Pennington, Missouri City, TX (US)

(73) Assignee: Ecolab USA Inc, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,414

(22) Filed: May 22, 2023

(65) Prior Publication Data

US 2023/0303908 A1    Sep. 28, 2023

Related U.S. Application Data

(62) Division of application No. 16/942,332, filed on Jul. 29, 2020, now Pat. No. 11,697,756.

(60) Provisional application No. 62/879,877, filed on Jul. 29, 2019.

(51) Int. Cl.
*C09K 8/52* (2006.01)
*C07F 11/00* (2006.01)
*C09K 8/524* (2006.01)

(52) U.S. Cl.
CPC ............ *C09K 8/524* (2013.01); *C07F 11/005* (2013.01); *C09K 8/52* (2013.01)

(58) Field of Classification Search
CPC ......... C09K 8/524; C09K 8/52; C07F 11/005; C10G 7/10; C10G 75/04; C10G 75/02
See application file for complete search history.

(56) References Cited

U.S. PATENT DOCUMENTS

| | | | |
|---|---|---|---|
| 3,356,702 A | 12/1967 | Farmer et al. | |
| 3,446,735 A | 5/1969 | Weise | |
| 3,522,093 A | 7/1970 | Woolman | |
| 4,024,050 A | 5/1977 | Shell et al. | |
| 4,024,051 A | 5/1977 | Shell et al. | |
| 4,226,700 A * | 10/1980 | Broom | C10G 9/16 208/48 AA |
| 4,298,454 A | 11/1981 | Aldridge et al. | |
| 4,370,221 A | 1/1983 | Patmorre et al. | |
| 4,428,848 A | 1/1984 | Levine et al. | |
| 4,511,405 A | 4/1985 | Reed et al. | |
| 4,542,253 A | 9/1985 | Kaplan et al. | |
| 4,551,227 A | 11/1985 | Porter et al. | |
| 4,559,152 A | 12/1985 | Schlicht | |
| 4,582,543 A | 4/1986 | Bretz | |
| 4,613,372 A | 9/1986 | Porter et al. | |
| 4,941,994 A | 7/1990 | Zetlmeisl et al. | |
| 5,000,836 A | 3/1991 | Forester | |
| 5,015,358 A | 5/1991 | Reed et al. | |
| 5,055,174 A * | 10/1991 | Howell | B01J 31/226 502/220 |
| 5,182,013 A | 1/1993 | Petersen et al. | |
| 5,252,254 A | 10/1993 | Babaian-Kibala | |
| 5,314,643 A | 5/1994 | Edmondson et al. | |
| 5,445,749 A | 8/1995 | Hong | |
| 5,552,085 A | 9/1996 | Babaian-Kibala | |
| 5,630,964 A | 5/1997 | Babaian-Kibala et al. | |
| 5,631,213 A | 5/1997 | Tanaka et al. | |
| 5,863,415 A | 1/1999 | Zetlmeisl | |
| 5,906,968 A | 5/1999 | McConnachie et al. | |
| 6,022,835 A | 2/2000 | Fletcher | |
| 6,207,625 B1 | 3/2001 | Ogano et al. | |
| 6,228,253 B1 | 5/2001 | Gandman | |
| 6,258,760 B1 * | 7/2001 | Ozaki | C10M 137/10 508/552 |
| 6,852,213 B1 | 2/2005 | Tong | |
| 7,311,144 B2 | 12/2007 | Conrad | |
| 7,727,942 B2 | 6/2010 | Wormuth et al. | |
| 7,763,744 B2 | 7/2010 | Tynik et al. | |
| 7,989,404 B2 | 8/2011 | Habeeb et al. | |
| 8,092,618 B2 | 1/2012 | Sharpe et al. | |
| 8,247,539 B2 | 8/2012 | Revel et al. | |
| 8,309,041 B2 | 11/2012 | Lott et al. | |
| 9,023,193 B2 | 5/2015 | Koseoglu | |
| 9,090,837 B2 | 7/2015 | Subramaniyam | |
| 9,115,319 B2 | 8/2015 | Subramaniyam | |
| 9,206,361 B2 | 12/2015 | Chabot et al. | |
| 9,233,359 B2 | 1/2016 | Borremans et al. | |
| 9,605,215 B2 | 3/2017 | Lott et al. | |
| 9,663,743 B2 | 5/2017 | Griffin et al. | |

(Continued)

FOREIGN PATENT DOCUMENTS

CN    1164867 A    11/1997
CN    101697038 A    4/2010

(Continued)

OTHER PUBLICATIONS

Babaian-Kibala (1994) "Phosphate ester inhibitors solve naphthenic acid corrosion problems", Oil & Gas Journal, 92 (9), 9 pages, (Abstract).
De Feo, et al. (2017) "Formation of interfacial molybdenum carbide for DLC lubricated by MoDTC: Origin of wear mechanism", Wear, 370-371:17-28.
C. Grossiord, et al. (1998) "MOS2 single sheet lubrication by molybdenum dithiocarbamate", Tribology International, 31(12):737-743.
C. Grossiord, et al. (1998) "In situ MoS2 formation and selective transfer from MoDPT films", Surface and Coatings Technology, 108-109:352-359.
International Search Report for International Application No. PCT/US2020/044009, mailed on Oct. 14, 2020, 7 pages.

(Continued)

*Primary Examiner* — Kumar R Bhushan
(74) *Attorney, Agent, or Firm* — Kagan Binder, PLLC

(57) ABSTRACT

Disclosed are molybdenum-containing complexes used in compositions and methods for inhibiting or reducing the deposition of foulant on equipment.

4 Claims, 2 Drawing Sheets

(56) References Cited

U.S. PATENT DOCUMENTS

| | | |
|---|---|---|
| 9,790,440 B2 | 10/2017 | Chang |
| 9,845,437 B2 | 12/2017 | Savage et al. |
| 9,890,339 B2 | 2/2018 | Subramaniyam |
| 9,951,290 B2 | 4/2018 | Gao et al. |
| 10,712,105 B1 | 7/2020 | Christensen et al. |
| 11,697,756 B2 | 7/2023 | Gul et al. |
| 2001/0001804 A1 | 5/2001 | Skledar et al. |
| 2007/0298505 A1 | 12/2007 | Smith et al. |
| 2009/0176671 A1 | 7/2009 | Ozaki et al. |
| 2010/0116718 A1 | 5/2010 | Subramaniyam |
| 2010/0152073 A1 | 6/2010 | Nelson et al. |
| 2010/0152074 A1* | 6/2010 | Nelson ............ C10M 141/12 508/108 |
| 2011/0160405 A1 | 6/2011 | Subramaniyam |
| 2014/0020645 A1 | 1/2014 | Guinther et al. |
| 2014/0100148 A1 | 4/2014 | Yagishita |
| 2016/0362619 A1 | 12/2016 | Subramaniyam |
| 2017/0240838 A1 | 8/2017 | Casey et al. |
| 2018/0100117 A1 | 4/2018 | Flores-Torres et al. |
| 2018/0100120 A1 | 4/2018 | Flores-Torres et al. |
| 2019/0225909 A1 | 7/2019 | Miller et al. |
| 2019/0264125 A1 | 8/2019 | Lino et al. |
| 2021/0032758 A1 | 2/2021 | Zenasni et al. |
| 2022/0017836 A1 | 1/2022 | Isa et al. |
| 2022/0033725 A1 | 2/2022 | Zenasni et al. |
| 2022/0033977 A1 | 2/2022 | Gul et al. |
| 2024/0279561 A1 | 8/2024 | Zenasni et al. |
| 2024/0287397 A1 | 8/2024 | Gul et al. |

FOREIGN PATENT DOCUMENTS

| | | | | |
|---|---|---|---|---|
| CN | 102575353 A | * | 7/2012 | ............ C10G 75/00 |
| CN | 104730602 A | | 6/2015 | |
| CN | 105482869 A | * | 4/2016 | |
| CN | 106010480 A | | 10/2016 | |
| CN | 108698027 A | | 10/2018 | |
| DE | 2840094 A1 | | 3/1980 | |
| EP | 0267674 A1 | | 5/1988 | |
| EP | 0727429 A2 | | 8/1996 | |
| EP | 0768366 A1 | * | 4/1997 | |
| EP | 1046700 A2 | | 10/2000 | |
| EP | 1870706 A1 | | 12/2007 | |
| EP | 2687582 A1 | | 1/2014 | |
| EP | 2716743 A1 | * | 4/2014 | .......... C10M 135/18 |
| JP | S57-140791 A | | 8/1982 | |
| JP | H0646243 U | | 6/1994 | |
| JP | 2010-510645 A | | 4/2010 | |
| WO | 96/06899 A1 | | 3/1996 | |
| WO | 98/33869 A1 | | 8/1998 | |
| WO | 2011/161982 A1 | | 12/2011 | |
| WO | 2020/105702 A1 | | 5/2020 | |
| WO | 2021/021888 A1 | | 2/2021 | |
| WO | 2021/021891 A1 | | 2/2021 | |
| WO | 2022/026434 A1 | | 2/2022 | |
| WO | 2022/026436 A1 | | 2/2022 | |

OTHER PUBLICATIONS

International Search Report for International Application No. PCT/US2020/044005, mailed on Oct. 13, 2020, 6 pages.

International Search Report for International Application No. PCT/US2021/043264, mailed on Nov. 10, 2021, 6 pages.

International Search Report for International Application No. PCT/US2021/043267, mailed on Oct. 28, 2021, 6 pages.

A. Morina, et al. (2006) "ZDDP and MoDTC interactions in boundary lubrication—The effect of temperature and ZDDP/MoDTC ratio", Tribology International, 39:1545-1557.

Oung et al. (1998) "Mitigating steel corrosion in cooling water by molybdate based inhibitors", Corrosion Prevention and Control. 45. 156-162 (Abstract only).

O.P. Parenago, et al. (2017) "Sulfur-Containing Molybdenum Compounds as High-Performance Lubricant Additives (Review)", Petroleum Chemistry, 57(8):631-642.

T. Sakurai, et al. (1971) "The Synthesis of Di-µ-thio-dithio-bis(dialkyldithiocarbamates) Dimolybdenum (V) and Their Effects on. Boundary Lubrication", Bulletin of The Japan Petroleum Institute, 13(2):243-249.

R. Sarin, et al. (1994) "Molybdenum dialkylphosphorodithioates:synthesis and performance evaluation as multifunctional additives for lubricants", Tribology International, 27(6):379-386.

Written Opinion for International Application No. PCT/US2020/044009, mailed on Oct. 14, 2020, 8 pages.

Written Opinion for International Application No. PCT/US2020/044005, mailed on Oct. 13, 2020, 8 pages.

Written Opinion for International Application No. PCT/US2021/043264, mailed on Nov. 10, 2021, 11 pages.

Written Opinion for International Application No. PCT/US2021/043267, mailed on Oct. 28, 2021, 9 pages.

L. Yan, et al. (2012) "Comparing tribological behaviors of sulfur- and phosphorus-free organomolybdenum additive with ZDDP and MoDTC", Tribology International, 53:150-158.

Brown et al., "Studies of Molybdenum and Tungsten Thiolates," Journal of the Chemical Society, Dalton Transactions, Issue 12, 1973, pp. 1311-1315.

\* cited by examiner

OIL SOLUBLE MOLYBDENUM COMPLEXES AS HIGH TEMPERATURE FOULING INHIBITORS

CROSS REFERENCE TO RELATED APPLICATIONS

This application is a divisional of U.S. patent application Ser. No. 16/942,332, filed Jul. 29, 2020, which claims the benefit of U.S. Provisional Patent Application Ser. No. 62/879,877, filed Jul. 29, 2019, the disclosures of which are incorporated by reference herein in their respective entireties for all purposes its entirety herein by reference.

FIELD

The application is directed at an anti-foulant composition.

BACKGROUND

The processes involved in petroleum and gas production, oil, gas, and petroleum refining, as well as petrochemical industries, for example, coking, visbreaking, reforming, hydroforming, absorption, isomerization, extraction, cracking, fractionation, hydrofining, desalting and the like, expose hydrocarbon streams to relatively elevated temperatures. The temperatures are most commonly attained by furnace heaters and heat exchangers in which the hydrocarbon feeds, products and intermediates are intimately contacted with heated surfaces. These conditions are known to promote the formation of deposits which can foul up various systems and processes. For example, foulant deposition can limit refining capacities and flow rates. The fouling in furnace heaters will cause heat transfer loss, hot spots throughout pipes, and metallurgy deformation issues. Fouling in heat exchangers will cause gradual efficiency loss, heat transfer loss, and pressure drop. These issues will reduce the throughput because of materials depositing on the inner surfaces thereof. Consequently, the process units must be periodically shut down and the deposits removed or the units replaced.

Coke is the typical foulant produced as a direct byproduct of polymerization and condensation reactions from lightest to heaviest fractions (maltenes, asphaltenes, and coke). Fouling is generally attributed to the presence of unstable components, such as thermally generated radicals, oxidized derivatives of hydrocarbons, the inorganic impurities present in hydrocarbon fractions, the presence of olefinic unsaturated hydrocarbons or their polymeric derivatives, or the like. Thus, almost all crude oil and fractions thereof, as well as process cuts prepared from such, contain reactive hydrocarbon constituents. Furthermore, almost all crude oil contains small amounts of dissolved oxygen, sulfur and metals, in a free and/or chemically combined state. If chemical and/or thermal treatment is involved, the reactive moieties in the hydrocarbon matrix may trigger the polymerization reactions.

Fouling of heat exchangers, and equipment such as furnaces, pipes, reboilers, condensers, compressors, auxiliary equipment, and the like, are costly because of the loss in production time and the increase in man hours required for disassembly, cleaning, and reassembly of the process equipment components.

SUMMARY

Disclosed are compositions and methods for inhibiting or reducing the deposition of foulant thereby improving energy efficiency of systems and preventing product quality issues.

In one aspect of the invention is disclosed a method of inhibiting deposition of a foulant comprising:

introducing into a process equipment or a fluid in contact with the process equipment a composition comprising a molybdenum-containing complex comprising:

at least one molybdenum-containing complex having the formula selected from Formula I, II, III, or IV.

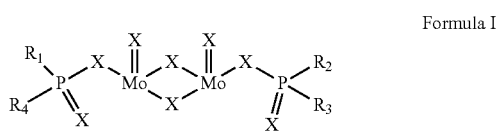

Formula I

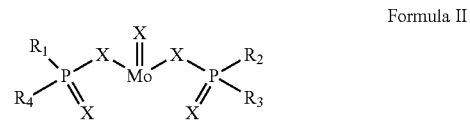

Formula II wherein $R_1$, $R_2$, $R_3$, and $R_4$, are each a hydrocarbon group and wherein $R_1$, $R_2$, $R_3$, and $R_4$ can be the same or different; and X is oxygen or sulfur and X can be the same or different.

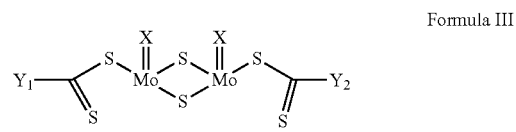

Formula III

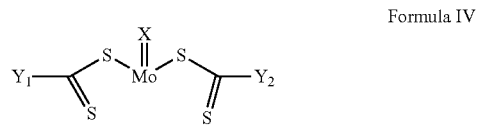

Formula IV wherein $Y_1$ and $Y_2$ are each oxygen, nitrogen or carbon-containing ligands and $Y_1$ and $Y_2$ can be the same or different, and X can be the same of different from each other.

In another aspect is disclosed a composition comprising at least one molybdenum-containing complex to inhibit deposition of a foulant in contact with process equipment, the at least one molybdenum-containing complex comprising the formula selected from Formula I, II, II or IV:

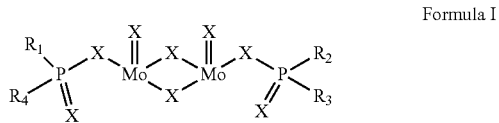

Formula I

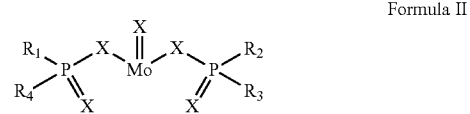

Formula II wherein $R_1$, $R_2$, $R_3$, and $R_4$, are each a hydrocarbon group and wherein $R_1$, $R_2$, $R_3$, and $R_4$ can be the same or different; and X is oxygen or sulfur and X can be the same or different.

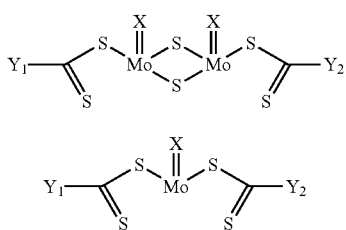

Formula III

Formula IV wherein $Y_1$ and $Y_2$ are each oxygen, nitrogen or carbon-containing ligands and $Y_1$ and $Y_2$ can be the same or different, and X is each oxygen or sulfur, and X can be the same of different from each other.

In still other embodiments is treated process equipment comprising a process equipment comprising a metal surface; and the fluid source comprising the molybdenum-containing complex as described in Formula I, II, III, and IV, wherein at least a portion of the metal surface is contacted by the fluid source.

The molybdenum-containing complex is used to inhibit organic and inorganic material that deposit on equipment during the operation of a manufacturing and/or chemical process, which deposition may be unwanted and includes but is not limited to asphaltene and coke.

DETAILED DESCRIPTION

Figure 1:
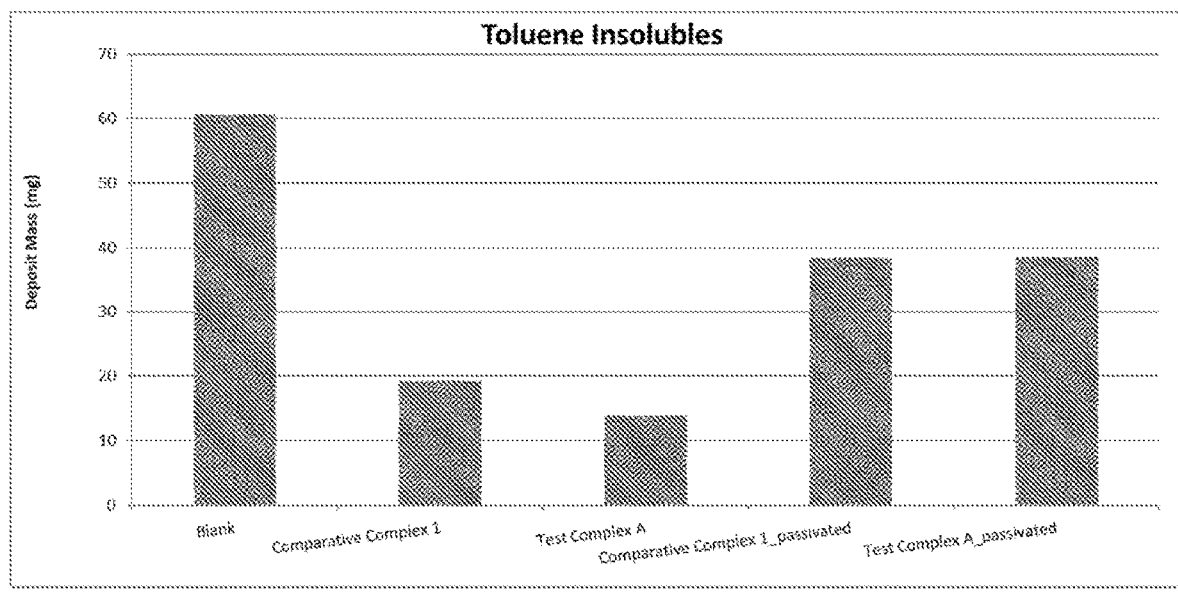
FIG. 1 is a graphical representation of the surface coke deposition from pyrolysis of a residue in the presence of Test Complex A compared to Comparative Complex 1 as anti-foulant and pre-passivation chemistries of an embodiment of the application.

Although the present disclosure provides references to embodiments, persons skilled in the art will recognize that changes may be made in form and detail without departing from the spirit and scope of the application. Reference to various embodiments does not limit the scope of the claims attached hereto. Additionally, any examples set forth in this specification are not intended to be limiting and merely set forth some of the many possible embodiments for the appended claims.

Publications, patents, and patent documents referred to in this application are incorporated by reference herein in their entirety as though individually incorporated by reference. If there inconsistencies between this application and the documents incorporated by reference, the application controls and the incorporated documents are supplementary to the application.

As used herein, the term "anti-foulant" refers to a complex that prevents, retards, mitigates, reduces, controls and/or delays the deposition of organic and inorganic materials such as polymers, prepolymers, oligomers and/or other materials on "process equipment." The term will be understood to refer to the anti-foulant itself or in a composition which may include other anti-foulants or compounds or solvents, as determined by context.

As used herein, the term "foulant" means organic and inorganic material that deposit on equipment during the operation of a manufacturing and/or petroleum and/or chemical processes, which may be unwanted and which may impair the cost and/or efficiency of the process and includes but is not limited to asphaltene and coke.

As used herein, the term "hydrocarbon processing" means a process performed on the hydrocarbon material that includes but not limited to refining, storing, transporting, fractionating or otherwise affecting the hydrocarbon material.

As used herein, the term "inhibits," "inhibiting," or grammatical equivalents thereof refer to preventing, retarding, mitigating, reducing, controlling and/or delaying the deposition of foulant.

As used herein, the term "passivation" means the prevention of a reaction between two materials when used together by coating at least one of the two materials to such an extent that they become substantially less reactive relative to each other.

As used herein, the term "process equipment" means equipment used to refine, store, transport, fractionate, or otherwise process a material including but not limited to heaters, heat exchangers, tubes, pipes, heat transfer vessels, process vessels, tanks, compressors, fans, impellers, pumps, valves, inter-coolers, sensors, and the like, that are associated with a process and which may be subject to the deposition of foulant. This term also includes sets of components which are in communication such as, for example, a gas compressor in an ethylene cracking process.

As used herein, the term "optional" or "optionally" means that the subsequently described event or circumstance may, but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations.

The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe any range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non-limiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5 and anything there between.

Described are compositions and methods to inhibit to the deposition of foulant in equipment and systems such as systems used in petroleum or hydrocarbon processing. The composition includes at least one molybdenum-containing complex. The molybdenum-containing complex contains at least one molybdenum center that is coordinated to phosphorous, sulfur, or oxygen and bearing oxygen, nitrogen or carbon-containing ligands including thiophosphates, phosphates, alkoxides, carbamates, thiocarbamates or polymers thereof. The described compositions and methods inhibit fouling by serving as antifoulant, or to passivate a surface or both.

In some embodiments, the molybdenum-containing complex is a metal containing complex.

In some embodiments, the molybdenum-containing complex has the general formula of Formula I or II.

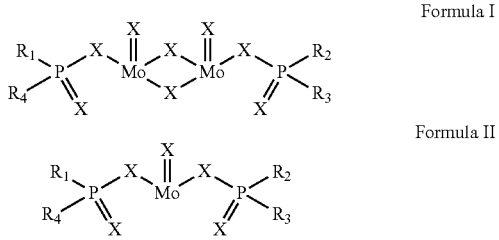

Formula I

Formula II wherein $R_1$, $R_2$, $R_3$, and $R_4$, are each a hydrocarbon group and wherein $R_1$, $R_2$, $R_3$, and $R_4$ can be the same or different; and X is oxygen or sulfur and X can be the same or different.

In some embodiments, $R_1$, $R_2$, $R_3$, and $R_4$, are each an alkyl group having 2 to 30 carbon atoms; 5 to 18 carbon atoms; 5 to 12 carbon atoms; 6 to 10 carbon atoms; or an aryl group (including alkylaryl group) having 6 to 18 carbon atoms. In some embodiments the number of carbon atoms described for the alkyl groups are characterized by one or more hydroxyl groups (e.g. alkyl alcohols). Examples of the alkyl group include ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl groups. These alkyl groups may be primary, secondary or tertiary alkyl groups and straight-chain or branched. Examples of the (alkyl)aryl groups include phenyl, tolyl, ethylphenyl, propylphenyl, butylphenyl, pentylphenyl, hexylphenyl, octylphenyl, nonylphenyl, decylphenyl, undecylphenyl, and dodecylphenyl groups, all of which alkyl groups may be primary, secondary or tertiary alkyl groups and straight-chain or branched. Furthermore, the (alkyl)aryl groups include all positional isomers wherein the aryl group may possess an alkyl substituent at any position.

In some embodiments, the R1, R2, R3, and R4, are each the alkoxides, thiolates, or phenoxides, phosphates, thiophosphates and polymers thereof, such as polythiophosphates. In some embodiments, the molybdenum-containing complex is a dithiophosphate.

In some embodiments, the molybdenum-containing complex is a sulfurized molybdenum dithiophosphate. In some embodiments the sulfurized molybdenum dithiophosphates are sulfurized molybdenum di ethyldithiophosphate, sulfurized molybdenum dipropyldithiophosphate, sulfurized molybdenum dibutyldithiophosphate, sulfurized molybdenum dipentyldithiophosphate, sulfurized molybdenum dihexyldithiophosphate, sulfurized molybdenum dioctyldithiophosphate, sulfurized molybdenum didecyldithiophosphate, sulfurized molybdenum didodecyldithiophosphate, sulfurized molybdenum di(butylphenyl)dithiophosphate, sulfurized molybdenum di(nonylphenyl)dithiophosphate, sulfurized oxymolybdenum diethyldithiophosphate, sulfurized oxymolybdenum dipropyldithiophosphate, di(2-ethylhexyl); dithiophosphate; sulfurized oxymolybdenum dibutyldithiophosphate, sulfurized oxymolybdenum dipentyldithiophosphate, sulfurized oxymolybdenum dihexyldithiophosphate, sulfurized oxymolybdenum dioctyldithiophosphate, sulfurized oxymolybdenum didecyldithiophosphate, sulfurized oxymolybdenum didodecyldithiophosphate, sulfurized oxymolybdenum di(butylphenyl)dithiophosphate, sulfurized oxymolybdenum di(nonylphenyl)dithiophosphate, all of which the alkyl groups may be straight-chain or branched and the alkyl groups may bond to any position of the phenyl groups, and mixtures thereof.

In other embodiments, molybdenum-containing complex is molybdenum dialkyl diphosphate; where the alkyl chains are a variation of the above-mentioned structures. Other embodiments include non-phosphorous molybdenum complexes in the form of molybdenum alkyloxides, molybdenum hydroxy-terminated amide complexes, all of which the alkyl groups may be straight-chain or branched and the alkyl groups may bond to any position of the phenyl groups, and mixtures thereof.

In some embodiments, the molybdenum-containing complex has the general formula of Formula III or IV.

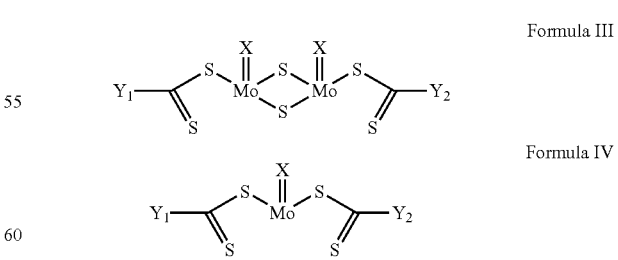

Formula III

Formula IV

Wherein $Y_1$ and $Y_2$ are each oxygen, nitrogen or carbon-containing ligands (viz., alcohols, alkyl or alkenyl groups, amides, amines, or aryl groups), and $Y^1$ and $Y^2$ can be the same or different, and X is each oxygen or sulfur, and X can be the same of different from each other. In some embodiments, at least $Y^1$ or $Y^2$ is an amine. In some embodiments, the molybdenum-containing complex is a dithiocarbamate. In some embodiments, the alkyl group is ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl groups. These alkyl groups may be primary, secondary or tertiary alkyl groups and straight-chain or branched. In some embodiments the (alkyl)aryl groups include phenyl, tolyl, ethylphenyl, propylphenyl, butylphenyl, pentylphenyl, hexylphenyl, octylphenyl, nonylphenyl, decylphenyl, undecylphenyl, and dodecylphenyl groups, all of which alkyl groups may be primary, secondary or tertiary alkyl groups and straight-chain or branched. Furthermore, the (alkyl)aryl groups include all positional isomers wherein the aryl group may possess an alkyl substituent at any position.

In some embodiments, the alcohol groups may be monosubstituted alcohols, diols or bis-alcohols, or polyalcohols. In some embodiments, the alcohols are straight chain C6-C10 alcohols and mixtures thereof. In some embodiments, the amino groups may be monoamines, diamines, or polyamines. In some embodiments, the amine is a dialkyl amine with the formula HNR5R6, where R5 and R6 are each selected from straight or branched chains containing 2 to 24 carbon atoms, or from 4-13; 8 to 13; or 10 to 20 carbon atoms. R5 can be the same or different from R6. In some embodiments, the R5 and R6 can be an aryl group including an alkylaryl group. In some embodiments the alkyl group is ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl groups. These alkyl groups may be primary, secondary or tertiary alkyl groups and straight-chain or branched.

In some embodiments the molybdenum-containing complex is a sulfurized molybdenum dithiocarbamates. In other embodiments, the sulfurized molybdenum dithiocarbamates are sulfurized molybdenum diethyldithiocarbamate, sulfurized molybdenum dipropyldithiocarbamate, sulfurized molybdenum dibutyldithiocarbamate, sulfurized molybdenum dipentyldithiocarbamate, sulfurized molybdenum dihexyldithiocarbamate, sulfurized molybdenum dioctyldithiocarbamate, sulfurized molybdenum didecyldithiocarbamate, sulfurized molybdenum didodecyldithiocarbamate, sulfurized molybdenum di(butylphenyl)dithiocarbamate, sulfurized molybdenum di(nonylphenyl)dithiocarbamate, sulfurized oxymolybdenum diethyldithiocarbamate, sulfurized oxymolybdenum dipropyldithiocarbamate, sulfurized oxymolybdenum dibutyldithiocarbamate, sulfurized oxymolybdenum dipentyldithiocarbamate, sulfurized oxymolybdenum dihexyldithiocarbamate, sulfurized oxymolybdenum dioctyldithiocarbamate, sulfurized oxymolybdenum didecyldithiocarbamate, sulfurized oxymolybdenum didodecyldithiocarbamate, sulfurized oxymolybdenum di(butylphenyl)dithiocarbamate, and sulfurized oxymolybdenum di(nonylphenyl)dithiocarbamate, all of which the alkyl groups may be straight-chain or branched and the alkyl groups may bond to any position of the phenyl groups, and mixtures thereof. Other molybdenum complexes are sulfurized molybdenum dithiolates, sulfurized molybdenum dithioester, or sulfurized molybdenum thio-terminated amide complexes, all of which the alkyl groups may be straight-chain or branched and the alkyl groups may bond to any position of the phenyl groups, and mixtures thereof.

In some embodiments, the molybdenum-containing complex is a thiocarbamate, phosphate or thiophosphate based and polymers thereof and mixtures thereof.

In some embodiments, the molybdenum-containing complexes are phosphorous- or sulfur-free. Examples of sulfur- and phosphorus-free molybdenum include molybdenum trioxide, ammonium molybdate, sodium molybdate and potassium molybdate.

In some embodiments, the molybdenum dithiophosphate includes molybdenum dialkyl (or diaryl) dithiophosphate such as molybdenum diisopropyldithiophosphate, molybdenum di-(2-ethylhexyl) dithiophosphate and molybdenum di-(nonylphenyl) dithiophosphate. molybdenum dithiocarbamates includes molybdenum dialkyldithiocarbamate such as molybdenum dibutyldithiocarbamate, molybdenum di-(2-ethylhexyl) dithiocarbamate and molybdenum dilauryldithiocarbamate.

Any method known to one of skill in the art may be used to prepare the molybdenum-containing complexes. For example, the molybdenum-containing complex may be prepared as described in Tribology International Vol. 27, Issue 6, p. 379-386 (1994); Tribology International Vol. 53, p. 150-158 (2012); and U.S. Pat. No. 3,356,702, the references incorporated herein by reference in their entireties.

In some embodiments, the compositions comprise, consist essentially of, or consist of at least one of the described molybdenum-containing complexes. The molybdenum-containing complexes can be formulated as an anti-foulant or passivation composition useful to inhibit deposition of foulant (e.g. coke) on metal surfaces of process equipment in contact with a hydrocarbon material (in either liquid or gaseous form) which surfaces or liquid reach temperatures from 200° C. to 1500° C. In some embodiments the compositions comprise, consist essentially of, or consist of at least one of the described molybdenum-containing complexes to inhibit fouling by serving as antifoulant, or to passivate a surface or both.

In some embodiments, the molybdenum-containing complex is formulated with solvents such as water, alcohols such as methanol, ethanol, isopropanol, n-propanol, n-butanol, isobutanol, sec-butanol, t-butanol or higher alcohols such as benzyl alcohol); ketones such as acetone, or methyl ethyl ketone (2-butanone); acetonitrile; esters such as ethyl acetate, propyl acetate and butyl acetate; ethers such as diethyl ether or higher, e.g. methyl t-butyl ether, glyme, diglyme, ethylene glycol monobutyl ether, ethylene diglycol ethyl ether, 1,4 dioxane and related; aromatics such as toluene, xylene(s), diethylbenzene, naphthalene and related aromatics or refinery cuts (heavy aromatic naptha, heavy aromatic distillates, and related); aliphatics such as pentane, hexane, heptane, octane, or refined gasoline.

In some embodiments, the solvents suitable for formulation with the molybdenum-containing composition are aliphatic, such as pentane, hexane, cyclohexane, methylcyclohexane, heptane, decane, dodecane, and the like, and aromatics, such as toluene, xylene, heavy aromatic naphtha, diesel, fatty acid derivatives (acids, esters, amides), and the like.

In some embodiments the one or more solvents are 10 wt % to 99 wt % of the molybdenum-containing complex; 1-25 wt %; 20-50 wt %; 30-75 wt %; 50-75%; 75-100 wt % of the molybdenum-containing complex.

In some embodiments, the molybdenum-containing complexes are provided neat (viz., without a solvent). In some embodiments, the molybdenum-containing complexes are provided as a concentrate.

In some embodiments, the molybdenum-containing complex or compositions containing them include other additives such as one or more asphaltene inhibitors, paraffin inhibitors, scale inhibitors, demulsifiers, water clarifiers, dispersants, emulsion breakers, antifoams, or any combination thereof. In some embodiments, the molybdenum-containing complex further comprises one or more solvents or a mixture thereof.

While an effective amount of the molybdenum-containing complex used depends on a number of factors such as the local operating conditions, the hydrocarbon to be processed, the temperature and other characteristics of the process, in some embodiments, the molybdenum-containing complex or in compositions are used in an amount from about 0.1 ppm to 10,000 ppm; from 0.1 ppm to 3,000 ppm; from about 100 ppm to 1000 ppm; from about 500 ppm to 3,000 ppm; from about 750 ppm to 3,000 ppm; from about 2,000 ppm to 5,000 ppm; from about 3,000 ppm to 5000 ppm; from about 100 ppm to 3,000 ppm; from about 1 ppm to 1000 ppm; from about 1 ppm to 3,000 ppm; from about 10 ppm to 50 ppm; from about 50 ppm to 100 ppm, from 100 pp to 800 ppm, from 150 ppm to 550 ppm; from about 1 ppm to 250 ppm; from about 1 ppm to 50 ppm; from about 1 ppm to 25 ppm; from about 1 ppm to 5 ppm; from about 3 ppm to 25 ppm; from 0.1 ppm to 5 ppm; or from about 0.1 ppm to 1 ppm by weight or volume of the molybdenum-containing complex in a fluid source.

The molybdenum-containing complex may be added by any suitable method. For example the molybdenum-containing complex may be added neat or as a dilute solution. In some embodiments, the molybdenum-containing complex may be introduced as a solution, emulsion, or dispersion that is sprayed, dripped, poured or injected into a desired opening within a system or onto the process equipment or process condensate. In some embodiments, the molybdenum-containing complex may be added with a wash-oil or an at-temperature water.

The molybdenum-containing complex can be added continuously or intermittently to the process equipment as required to inhibit fouling. In some embodiments, the molybdenum-containing antifouling complex is introduced during or after a decoking or cleaning process such as an online spalling, mechanical pigging, or steam/air burning process. In some embodiments, the molybdenum-containing antifouling complex is introduced during a warm up process, viz., bringing the unit back to process temperatures after a shut down and/or cleaning process. In some embodiments, the molybdenum-containing complex is introduced to passivate the surfaces when the equipment is shut down and decoked and cleaned. In other embodiments, the molybdenum-containing complex is added and passivation can occur without shutting down the equipment. Any known method in the art to passivate surfaces can be used, such as for example U.S. Pat. No. 9,845,437, which reference is incorporated herein by reference in its entirety.

In some embodiments, the molybdenum-containing complex can be pumped or injected into a system in a continuous fashion or as an intermittent fashion to mitigate the fouling in the process unit. The injection point can be at any or all stages of the process unit.

The molybdenum-containing complex is used on any suitable process equipment such as process equipment used in the production and refining of oil and gas. In some embodiments, the process equipment includes thermal conversion units, heat exchanger, visbreakers, cokers, fired heaters, furnaces, fractionators, or other heat transfer equipment. In some embodiments the process equipment is gas compressors. In some embodiments, the process equipment is coils, heat exchangers, transfer line exchangers quench coolers, furnaces, separation columns or fractionators. The molybdenum-containing complex can also be useful in other similar applications and with other equipment. For example, the molybdenum-containing complex may be used with any process where process equipment will come into contact with unsaturated monomers, such as in an ethylene cracked gas process. Another application is ethylene and acrylonitrile quench water systems. The molybdenum-containing complex may be used with ethylene dilution steam generators and acrylonitrile purification systems. Many polymer processes have monomer recovery systems which are subject to fouling and are good target applications for the molybdenum-containing complex. Water strippers and waste water strippers used with petrochemical processes such as styrene, butadiene, acrylonitrile, and ethylene processes are potential applications for the molybdenum-containing complex. In some embodiments, ethylene acid gas scrubbers and butadiene solvent recovery systems are also end use applications of the molybdenum-containing complex. The molybdenum-containing complex can be used in any process which has process equipment subject to foulant (e.g. polymers) forming and depositing on process equipment. In some embodiments, the molybdenum-containing complex can prevent polymerization and deposition of the polymers on process equipment in a primary fractionation process, light ends fractionation, non-aromatic halogenated vinyl fractionation, process-gas compression, dilution steam system, caustic tower, quench water tower, butadiene extraction. In some embodiments, the molybdenum-containing complex can inhibit the polymerization of resins and compositions comprising unsaturated species. In some embodiments, fouling is inhibited by using the molybdenum-containing complex to surface passivate processing equipment.

The molybdenum-containing complexes are not used in processing equipment such as an engine, hydraulic brake, power steering system, or transmission nor are the molybdenum-containing complexes used as a coolant additive in hydraulic fluid.

In some embodiments the molybdenum-containing complex is introduced into a fluid by any means suitable for ensuring dispersal of the molybdenum-containing complex through the fluid source being treated. The composition comprising the molybdenum-containing complex can be injected as prepared or formulated in one or more additional solvents, depending upon the application and requirements. One of skill in the art will understand that the methods disclosed herein are not limited in any way by the introduction method, the timing or the location of the introduction.

In some embodiments, the molybdenum-containing complex or in compositions is introduced to a fluid source using various well-known methods and they may be introduced at numerous, different locations throughout a given system. In one embodiment, the composition comprising the molybdenum-containing chemistry is pumped into an oil/gas pipeline using an umbilical line. In some embodiments, capillary string injection systems may be utilized to deliver the composition. U.S. Pat. No. 7,311,144 provides a description of an apparatus and methods relating to capillary injection, the disclosure of which is incorporated into the present application in its entirety. In other embodiments, the composition comprising the one or more molybdenum-containing complex is injected using mechanical equipment such as chemical injection pumps, piping tees, injection fittings, and the like.

In some embodiments the molybdenum-containing complex is introduced into process equipment or fluid in contact with the process equipment. In some embodiments, the process equipment is used to refine, store, transport, fractionate, or otherwise process a hydrocarbon such as crude oil, natural gas, petroleum and petroleum fractions.

The molybdenum-containing complex or in compositions is introduced into process equipment to form treated process equipment. In some embodiments, treated process equipment can be observed to undergo less foulant deposition than on process equipment without addition of the molybdenum-containing complex or in compositions.

Inhibition in the foulant formation or foulant deposition can be evaluated by any known method or test. In some embodiments, the inhibition of foulant formation and foulant deposition on process equipment can be assessed by measuring weight gain caused by foulant deposition as described in Examples 1 and 2.

The molybdenum-containing complex or in compositions can be used for any process equipment having a metal surface. In some embodiments, the metal surface of the process equipment is metal or metal alloys. For example, the metal surface can include steel (including carbon steel, stainless steel, galvanized steel, hot dipped galvanized steel, electrogalvanized steel, annealed hot dipped galvanized steel, or mild steel), nickel, titanium, tantalum, aluminum, copper, gold, silver, platinum, zinc, nickel titanium alloy (nitinol), an alloy of nickel, chromium, iron, iridium, tungsten, silicon, magnesium, tin, alloys of any of the foregoing metals, coatings containing any of the foregoing metals, and combinations thereof. In some embodiments, the metal surface of the process equipment is iron alloys, carbon steel, stainless steel, nickel-chromium-iron alloys, or other alloys.

In some embodiments, the deposition of foulant inside process equipment treated with the molybdenum-containing complex is reduced by at least 50 wt % compared to process equipment not treated with the molybdenum-containing foulant. In some embodiments, about 50 wt % to 100 wt % (where 100 wt % reduction in polymer formation is elimination of deposition), or about 50 wt % to 95 wt %, or about 50 wt % to 90 wt %, or about 50 wt % to 85 wt %, or about 50 wt % to 80 wt %, or about 50 wt % to 75 wt %, or about 50 wt % to 70 wt %, or about 55 wt % to 100 wt %, or about 60 wt % to 100 wt %, or about 65 wt % to 100 wt %, or about 70 wt % to 100 wt %, or about 60 wt % to 95 wt %, or about 70 wt % to 95 wt %, or about 60 wt % to 90 wt %, or about 70 wt % to 90 wt %. The effectiveness of the molybdenum-containing complex on reducing fouling can be assessed by measuring weight gain caused by foulant deposition as described in Examples.

The molybdenum-containing complexes are used in a method to passivate the surfaces of a process equipment to provide a treated process equipment. The treated process equipment mitigates (e.g. inhibits) the fouling on the metal surfaces. Examples of passivation are described in U.S. Pat. Nos. 4,024,050, 3,522,093, 6,228,253, ASTM A-967, and ASTM A-380, which references are incorporated herein by reference in their entirety. In some embodiments, passivation is carried out before the process equipment is used for a hydrocarbon processing (e.g. prior to hydrocarbon cracking) and/or after the process equipment has been de-coked or cleaned, and referred herein as pre-passivation.

In some embodiments, the molybdenum-containing complexes is introduced into the hydrocarbon feedstock before or during the processing of the hydrocarbon feedstock, and referred here as passivation. In the method to pre-passivate or passivate, in some embodiments, the molybdenum complex is introduced continuously or intermittently.

In some embodiments, the molybdenum-containing complexes are introduced at an initial dosage rate and for short time period to result in coating of the metal surface. In some embodiments, the molybdenum-containing complexes are introduced at a rate of about 1 ppm to about 3,000 ppm or about 500 ppm to about 2,000 ppm and to maintain this level for a time period ranging from 12 hour to 48 hours or 12 hours to 24 hours until the molybdenum-containing complexes induces the build-up of a protective coating (e.g. unreactive) on the metal surfaces. In other embodiments, the molybdenum-containing complexes is dosed at a concentration that is at least double the initial dosage rate for a period of 1 hour to 12 hours prior to introducing the fluids to be processed. In some embodiments, the molybdenum-containing complexes are introduced at a rate of about 1000 ppm to about 3,000 ppm for a time period ranging from 6 hour to 12 hours.

In other embodiments, the molybdenum-containing complexes is dosed at a concentration that is at least double the initial dosage rate for a period of 1 hour to several hours while simultaneously introducing fluids to be processed.

Once the protective surface is established, the dosage rate needed to maintain the protection may be reduced from 1 ppm to 3000 ppm to at least 1 ppm to 1000 ppm. In some embodiments the dosage for a continuous application of the molybdenum-containing complex into the fluid is 1 ppm-1000 ppm; 1-500 ppm, 1-250 ppm, 100-200 ppm, or 500-1000 ppm without substantial sacrifice of protection.

In some embodiments, the molybdenum-containing complexes are used as disclosed in U.S. Provisional Application 62/879,817 filed herewith.

EXAMPLES

The following examples are intended to illustrate different aspects and embodiments of the application and are not to be considered limiting the scope of the application. It will be recognized that various modifications and changes may be made without following the experimental embodiments described herein, and without departing from the scope of the claims.

Example 1—High Temperature Organic Fouling Inhibition

The molybdenum-containing complex used as anti-coke inhibitors was evaluated by gain in weight of SS304 mesh coupons from coke deposition. A reactor apparatus was used to simulate the coking process conditions and temperatures.

Table 1 shows the experimental conditions used in the autoclave testing:

TABLE 1

Experimental Parameters used in High Temperature Anti-fouling Testing

| Experimental Variable | Parameter |
|---|---|
| Temperature | 410° C. |
| Shear rate | 600 rpm after the temperature reaches 410° C. |
| Reaction N2 pressure | 8 bar @ room temperature |
| Time | 40 minutes |
| Autoclave testing medium | Vacuum distillation bottom residue (e.g., heavy content of petroleum) |
| Metal inserts | SS304 mesh |
| Pre-passivation dose | 1000 ppm |
| Anticoke dose (continuous process dose) | 3000 ppm |

Mesh Prepassivation Step 500 mL of paraffin oil solution was placed in a 1 L glass reactor and heated to 250° C. Metal meshes were first weighed on an analytical balance (four-decimal). Next the meshes were immersed in paraffin oil that was heated at 250° C. and subjected to continuous nitrogen purging. To the heated oil was added 1000 ppm dose of an anti-foulant composition tested and the resulting paraffin oil solution was stirred at 250° C. for 1 hour. This heating and introducing the test anti-foulant simulates the process as a real unit in which the passivator would be applied over a short time frame (12 to 24 hours) at a high concentration in a hydrocarbon medium during the warm up of equipment. After 1-hour of passivation, heating was stopped. Once the oil cooled down (<80° C.), the meshes were removed from the oil, washed with toluene and isopropanol, and dried using a nitrogen gas stream.

Anti-Fouling Testing

A prepassivated SS304 mesh (as described above) was weighed on an analytical balance (four-decimal) and inserted into a high pressure/high temperature autoclave vessel. Then, 50 g vacuum distillation bottom residue was added into the autoclave. Subsequently, the vessel was sealed and tightened using a set of bolts/screws. The atmosphere inside the vessel was first purged with N2 using three rounds of 100 psi N2 fills/releases. The vessel was then pressurized with N2 to 100 psi and then inserted inside a heating element or mantle. The reactor content was continuously mixed while the vessel was heating to 410° C. Once the target temperature of 410° C. was reached, the pyrolysis experiment time was started.

Subsequently, the autoclave was cooled down to 350° C., the pressure inside the vessel was released, and then purged with N2. Next, the heating mantle was turned off and the vessel temperature dropped below 150° C., the autoclave was removed from the heating mantle and disassembled and the mesh was removed and washed with toluene. The dried mesh was weighed using the same analytical balance used to initially weight prepassivated SS304 mesh, and the weight gain was calculated.

FIG. 1 shows the response for Test Complex A (molybdenum dialkyldithiophosphate) compared to Comparative Complex 1 (a mixture of a mono- and di-alkyl phosphate ester) for the tested residual deposition amounts. Comparative Complex 1 was used as a benchmark for surface passivation. The repeatability of the pyrolysis experiments in the mentioned reactors is ±1 mg. Columns 2 & 3 in FIG. 1 shows the anti-coke (continuous) dose performances of the chemistries while columns 4 & 5 show the passivation effectiveness of the chemistries. FIG. 1 also shows that Test Complex A was more effective at inhibiting foulant deposition compared to Comparative Complex 1 in the continuous process. On the other hand, Test Complex A and Comparative Complex 1 showed similar performances when used as a passivation chemistry. One can also conclude that Test Complex A and Comparative Complex 1 reduced the surface coke deposition in a similar extent with the current residue feed sample if they are used as anti-coke chemistries.

Example 2

The performance of the molybdenum-containing complex (Test Complex A as described in Example 1) was compared to two other benchmark anti-coke chemistries in a manner as described in Example 1. The benchmark Comparative Complex 2 and Comparative Complex 3 are magnesium-based products.

Figure 2:
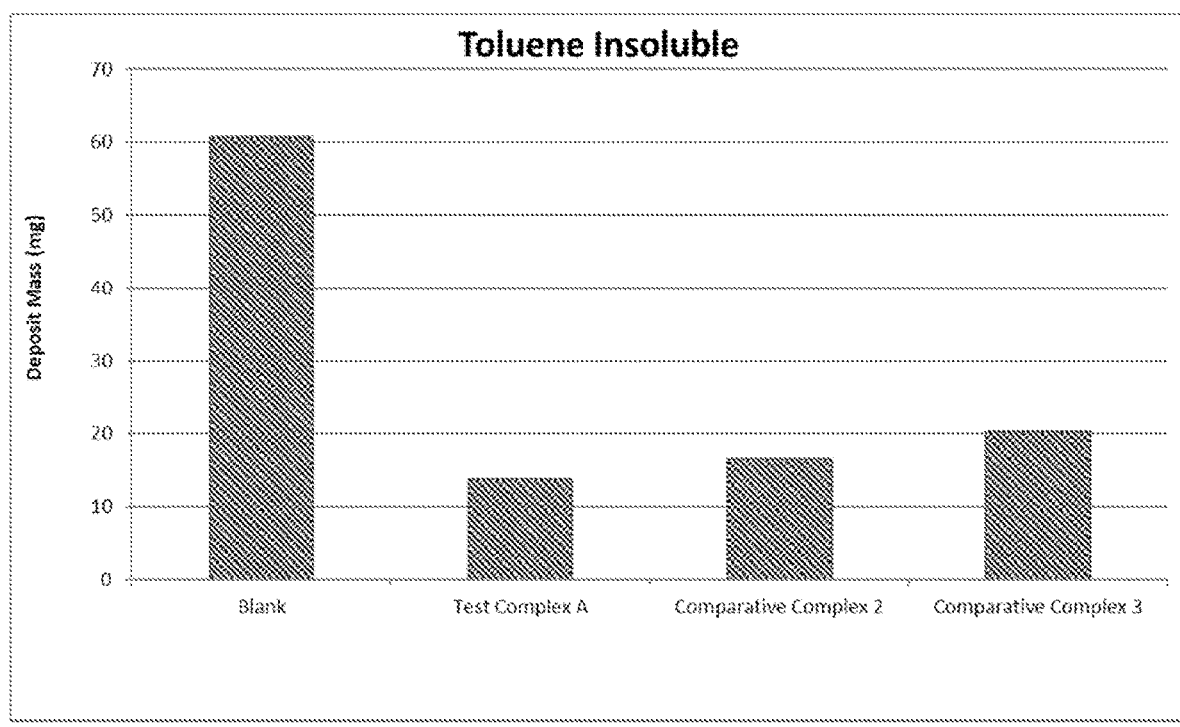
FIG. 2 is a graphical representation of surface coke deposition results from the pyrolysis of a residue in the presence of Test Complex A and other benchmark anti-foulant chemistries (Comparative Complexes 2 & 3).

FIG. 2 depicts the results of such comparison, which shows a better performance of the molybdenum-containing complex product (Test Complex A) relative to those of magnesium products (Comparative Complex 2-3). The difference of inhibition rate of Test Complex A is attributed to the better stabilization of the thermally generated radicals during pyrolysis process, which leads to the formation of larger structures.

Example 3 (Prophetic)

The anti-fouling of Test Complex B (a Mo dialkyldithiocarbamate complex) will be evaluated via weight gain analysis of coupons (inhibition rate) using the method as described in Example 1. A dose response profile for the Test Complex B will be compared to a Comparative Compound 20 (a mixture of a mono- and di-alkylcarbamates) and a Comparative Compound 21 (ethylhexal carbamate) in the dose range from about 175-500 ppm.

Example 4 (Prophetic)

The performance of the molybdenum-containing Test Complex B (as described in Example 3) will be compared to other benchmark anti-coke chemistries (magnesium-based products in a manner as described in Examples above. Blank will be the sample with no test complex or comparative compounds.

The application is further described below with additional non-limiting embodiments:

1. A method of inhibiting deposition of a foulant comprising:
introducing into a process equipment or a fluid in contact with the process equipment a composition comprising a molybdenum-containing complex comprising:
at least one molybdenum-containing complex having the formula selected from Formula I, II, III, or IV.

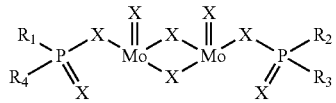

Formula I

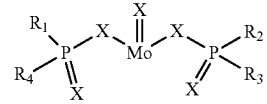

Formula II wherein $R_1$, $R_2$, $R_3$, and $R_4$, are each a hydrocarbon group and wherein $R_1$, $R_2$, $R_3$, and $R_4$ can be the same or different; and X is oxygen or sulfur and X can be the same or different.

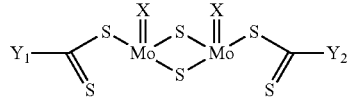

Formula III

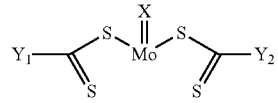

Formula IV wherein $Y^1$ and $Y^2$ are each oxygen, nitrogen or carbon-containing ligands and $Y^1$ and $Y^2$ can be the same or different, and X is each oxygen or sulfur, and X can be the same of different from each other.

2. The method of embodiment 1, wherein the introducing is by injecting, spraying, or dripping the molybdenum-containing complex.

3. The method as in any one of embodiments 1-2, wherein the introducing is carried out after or during a decoking or cleaning or during a warm up process.

4. The method as in any one of embodiments 1-3, wherein the introducing is carried out during a hydrocarbon processing.

5. The method as in any one of embodiments 1-4, wherein the introducing is carried out intermittently.

6. The method as in any one of embodiments 1-4, wherein the introducing is carried out continuously.

7. The method as in any one of embodiments 1-6, wherein the process equipment comprises coils, heat exchangers, transfer line exchangers quench coolers, furnaces, separation columns or fractionators.

8. The method as in any one of embodiments 1-7, wherein the process equipment comprises iron or iron alloys.

9. The method as in any one of embodiments 1-8, wherein the iron alloys comprise carbon steel, stainless steel, or nickel-chromium-iron alloys.

10. The method as in any one of embodiments 1-9, wherein the foulant comprises coke, sludge, corrosion products, polymers, and catalyst fines.

11. The method as in one of embodiments 1-10, wherein the fluid comprises at least a liquid hydrocarbon material.

12. The method as in one of embodiments 1-11, wherein the molybdenum-containing complex is added to the fluid from 1 ppm to 3000 ppm of the fluid volume.

13. The method as in one of embodiments 1-12, wherein the molybdenum-containing complex further comprises one or more, asphaltene inhibitors, paraffin inhibitors, scale inhibitors, emulsifiers, water clarifiers, dispersants, emulsion breakers, or any combination thereof.

14. The method as in one of embodiments 1-13, wherein the R1, R2, R3, and R4 of formulae I and II comprise thiophosphates, phosphates and polymers thereof.

15. The method as in one of embodiments 1-13, wherein the $Y^1$ and $Y^2$ of formulae III and IV comprise thiocarbamates and polymers thereof.

16. The method as in one of embodiments 1-15, wherein the at least one molybdenum-containing complex comprises a molybdenum dithiocarbamate, dithiophosphate, polymers thereof and combinations thereof.

17. The method of embodiment 16, wherein the molybdenum dithiocarbamate comprises an alkyldithiocarbamate.

18. The method of embodiment 17, wherein the alkyldithiocarbamate comprises an ethyl hexyl dithiocarbamate, straight chain C6-C10 alcohols or mixtures thereof.

19. The method of embodiment 16, wherein the molybdenum dithiophosphate comprises an alkyldithiophosphate.

20. The method of embodiment 19, wherein the alkyldithiophosphate comprises an ethyl hexyl, straight chain C6-C10 alcohols or mixtures thereof.

21. The method as in one of embodiments 1-20 wherein the molybdenum-containing complex provides at least 70% inhibition of foulant deposition.

22. The method as in one of embodiments 1-21, wherein the molybdenum-containing complex provides at least 70% inhibition of foulant deposition in a SS304 mesh test.

23. The method as in one of embodiments 1-22, wherein the introducing the molybdenum-containing complex inhibits foulant deposition of a process equipment compared to a process equipment under the same conditions without the introduction of the molybdenum-containing complex.

24. A composition comprising at least one molybdenum-containing complex to inhibit deposition of a foulant in contact with process equipment, the at least one molybdenum-containing complex comprising the formula selected from Formula I, II, II or IV:

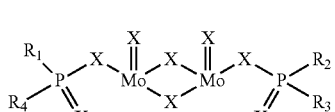

Formula I

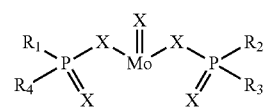

Formula II wherein R1, R2, R3, and R4, are each a hydrocarbon group and wherein R1, R2, R3, and R4 can be the same or different; and X is oxygen or sulfur and X can be the same or different.

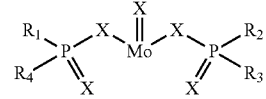

Formula III

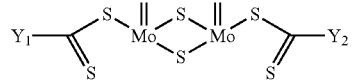

Formula IV wherein $Y^1$ and $Y^2$ are each oxygen, nitrogen or carbon-containing ligands and $Y^1$ and $Y^2$ can be the same or different, and X is each oxygen or sulfur, and X can be the same of different from each other.

25. The composition of embodiment 24, wherein the composition further comprises one or more, asphaltene inhibitors, paraffin inhibitors, scale inhibitors, emulsifiers, water clarifiers, dispersants, emulsion breakers, or any combination thereof.

26. The composition as in one of embodiments 24-25, wherein the R1, R2, R3, and R4 of formulae I and II comprise thiophosphates, phosphates and polymers thereof.

27. The composition as in one of embodiments 24-26, wherein the $Y^1$ and $Y^2$ of formulae III and IV comprise thiocarbamates and polymers thereof.

28. The composition as in one of embodiments 24-27, wherein the at least one molybdenum-containing complex comprises a molybdenum dithiocarbamate, dithiophosphate, polymers thereof and combinations thereof.

29. The composition of embodiment 28, wherein the molybdenum dithiocarbamate comprises an alkyldithiocarbamate.

30. The composition of embodiment 29, wherein the alkyldithiocarbamate comprises an ethyl hexyl dithiocarbamate, straight chain C6-C10 alcohols or mixtures thereof.

31. The composition of embodiment 28, wherein the molybdenum dithiophosphate comprises an alkyldithiophosphate.

32. The method of embodiment 31, wherein the alkyldithiophosphate comprises an ethyl hexyl, straight chain C6-C10 alcohols or mixtures thereof.

33. The composition as in one of embodiments 24-32, wherein the molybdenum-containing complex is about 1 ppm to 3000 ppm of the composition.

34. A composition comprising:
a fluid; and
the at least one molybdenum-containing complex as in one of embodiments 24-33.

35. The composition as in one of embodiments 22-34, wherein the fluid is in contact in with coils, heat exchangers, transfer line exchangers quench coolers, furnaces, separation columns or fractionators.

36. The composition as in one of embodiments 24-35, wherein the fluid comprises at least a liquid hydrocarbon fraction.

37. The composition as in one of embodiments 24-36, wherein the hydrocarbon fraction is a distillate.

38. The composition as in one of embodiments 24-37, wherein the fluid temperature is 200° C. to 1500° C.

39. A treated process equipment comprising:
a process equipment comprising a metal surface; and
the fluid source comprising the molybdenum-containing complex as in one of embodiments 24-38, wherein at least a portion of the metal surface is contacted by the fluid source.

40. The treated process equipment of embodiment 39, wherein the process equipment comprises iron or iron alloys.

41. The treated process equipment of embodiment 40, wherein the iron alloys comprise carbon steel, stainless steel, nickel-chromium-iron alloys, or other alloys.

42. The treated process equipment as in one of embodiments 39-41, wherein the metal containment comprises coils, heat exchangers, transfer line exchangers quench coolers, furnaces, separation columns or fractionators.

43. The treated process equipment as in one of embodiments 39-42, wherein the fluid comprises, at least liquid hydrocarbon fraction.

44. Use of the molybdenum-containing complex as in one of embodiments 1-44 to inhibit foulant deposition.

The application illustratively disclosed herein can be suitably practiced in the absence of any element which is not specifically disclosed herein. Additionally each and every embodiment of the application, as described herein, is intended to be used either alone or in combination with any other embodiment described herein as well as modifications, equivalents, and alternatives thereof. In various embodiments, the application suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A treated process equipment comprising:
a process equipment comprising a passivated metal surface, wherein the passivated metal surface is protected by a molybdenum-containing coating formed by contacting a metal surface with a molybdenum dithiophosphate in a manner effective to provide the passivated metal surface; and
a hydrocarbon fluid source comprising a foulant and a molybdenum-containing additive, wherein at least a portion of the metal surface is contacted by the hydrocarbon fluid source.

2. The treated process equipment of claim 1, wherein the molybdenum dithiophosphate has the formula

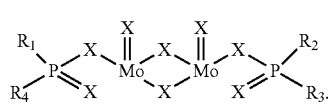

Formula I wherein $R_1$, $R_2$, $R_3$, and $R_4$, are a hydrocarbon-containing group selected from an alkyl group having 2 to 30 carbon atoms or an alkoxide having 2 to 30 carbon atoms; wherein $R_1$, $R_2$, $R_3$, and $R_4$ can be the same or different; and wherein each X is sulfur.

3. The treated process equipment of claim 1, wherein the molybdenum dithiophosphate comprises a molybdenum ethyl hexyl dithiophosphate.

4. The treated process equipment of claim 1, wherein the foulant comprises coke.

* * * * *